United States Patent
Clontz

[11] 3,890,848
[45] June 24, 1975

[54] CONTROL ASSEMBLY FOR REAR VIEW MIRROR

[76] Inventor: James G. Clontz, 108 S. Gum St., Summerville, S.C. 29483

[22] Filed: May 13, 1974

[21] Appl. No.: 469,479

[52] U.S. Cl. .................. 74/501 M; 74/108; 74/512
[51] Int. Cl. ............................................. F16c 1/10
[58] Field of Search ...... 74/501 M, 501 R, 512, 514, 74/108

[56] References Cited
UNITED STATES PATENTS

| | | | |
|---|---|---|---|
| 2,573,127 | 10/1951 | Von Bredow | 74/108 |
| 3,261,226 | 7/1966 | Dent | 74/501 M |
| 3,306,696 | 2/1967 | Tann | 74/501 R |

Primary Examiner—Samuel Scott
Assistant Examiner—F. D. Shoemaker
Attorney, Agent, or Firm—Bailey & Dority

[57] ABSTRACT

A control apparatus for a rear view mirror is illustrated wherein a vertical standard is turned about a substantially vertical axis with means for mounting the standard externally of the vehicle with depressible foot operated pedal mechanism operating against a coiled spring adjacent the floor board of the vehicle for operating linkage for moving the mirror from an adjusted position to a position for observing a passing motorist, the spring mechanism returning the mirror to adjusted position automatically upon release of the pedal.

2 Claims, 3 Drawing Figures

PATENTED JUN 24 1975

CONTROL ASSEMBLY FOR REAR VIEW MIRROR

BACKGROUND OF THE INVENTION

Remote control rear view mirrors have been provided for achieving adjusted position about both vertical and horizontal axis by remote control. Mechanism has also been provided for automatically returning the mirror to an adjusted position, usually operated remotely and by hand such as illustrated in U.S. Pat. No. 2,903,944 and 3,438,281. The operation of such devices is often eratic due to the fact that the spring return mechanism is generally positioned closely adjacent the mirror rather than adjacent the operator within the vehicle. Furthermore, due to the fact that such devices are operated by hand, their operation constitutes a distraction to the driver who needs the use of both hands for maintaining the vehicle under proper control preparatory to passing.

Accordingly, it is an improtant object of this invention to provide a foot pedal externally positioned rear view mirror which may be moved to observe a passing vehicle and automatically returned to normal or adjusted position.

Another important object of the invention is to provide a remote control rear view mirror which is foot operated and wherein a spring mechanism located adjacent a foot pedal positively controls return of the mirror to normal operating position after scanning a predetermined arc to check for passing vehicles.

BRIEF SUMMARY OF THE INVENTION

It has been found that a rear view mirror may be mounted externally of a vehicle for pivotal movement on a vertical standard responsive to a foot pedal positioned adjacent the floor board of the vehicle for operating a spring compressed by the pedal for positively returning the standard to normal operating position through the use of the flexible cable connecting linkage for operating the mirror to the pedal mechanism.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
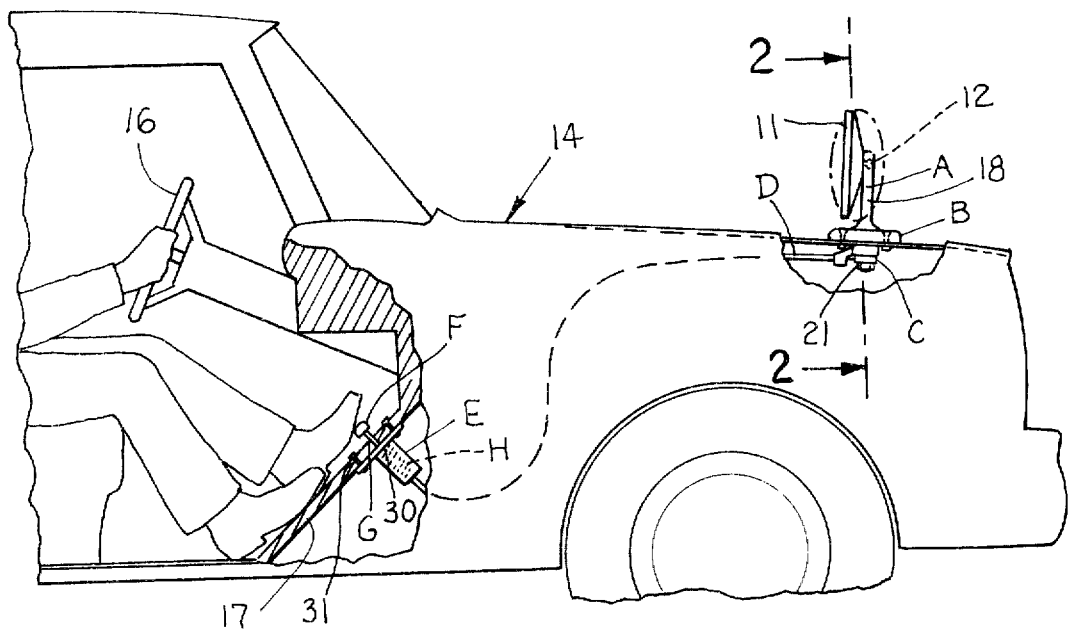
FIG. 1 is a schematic side elevation illustrating a mirror apparatus constructed in accordance with the present invention installed upon a vehicle.

The drawing illustrates a rear view mirror mounted externally of a vehicle operable by the driver's foot adjacent the floorboard interiorly of the vehicle for observing the position of a passing motorist. A substantially vertical standard A is carried externally of the vehicle supporting the mirror in an adjusted position. Means B is provided for mounting the standard on the vehicle for ocillatory movement about a fixed substantially vertical axis externally of the vehicle. Linkage means C is carried by the standard extending laterally thereof. A flexible cable D is connected on one end to the linkage means for moving the linkage means imparting oscillatory movement to the standard. An elongated housing E is carried by the vehicle adjacent the floorboard for receiving the other end of the cable. A pedal F is carried interiorly of the vehicle adjacent the floorboard depressible by the driver's foot. An operator G extends from the pedal into the housing engaging the other end of the cable within the housing for movement responsive to movement of the pedal. Resilient means H, within the housing, exert a resilient force urging the operator in a direction against movement by the pedal. Thus, the mirror may be moved from the adjusted position to a position for observing a passing motorist by depression of the pedal by the driver's foot, and the mirror will return to the adjusted position automatically responsive to the resilient means upon release of the pedal by the driver's foot.

The rear view mirror includes an element 10 having a reflective surface carried within a supporting frame 11. The frame 11 carries a ball 12 received within a socket carried by a substantially vertical standard A. The mirror 10 and the frame 11 may be positioned in an operating or adjusted position by the ball 12 and the socket 13 carried by the standard A which affords the usual ball and socket 13 adjustment mechanism. The mirror is illustrated as being mounted externally of an automobile broadly designated at 14. The automobile has a fender 15 which carries the mirror and associated assembly mechanism, a steering wheel 16 and the floorboard 17.

The substantially vertical standard A includes an upstanding portion 18 which carries the ball and socket member adjacent the upper end thereof. A reduced base portion 19 is carried for oscillatory movement about a fixed substantially vertical axis within the mounting means B and a further reduced lower portion 20 is threaded to receive a nut 21 and washer 21a for retaining linkage means C thereon for oscillating or rotating the reduced portion 20 of the standard 19 within mounting means B.

The mounting means B includes an upper bracket 22 having a vertical bore 23 therein for receiving the reduced portion 19 of the standard A. A complimentary lower bracket portion 24 is carried beneath the fender 15 and has a complimentary bore 25 therein for receiving the reduced portion 19. Suitable fastening means such as screws 26 retain the brackets 22 and 24 in assembled relation on the fender 15. The complimentary bracket portion 24 has an integral support arm 27 extending downwardly therefrom to slidably support a flexible cable D. The flexible cable D is, in turn, attached to the linkage mechanism C as by a set screw 28.

Figure 3:
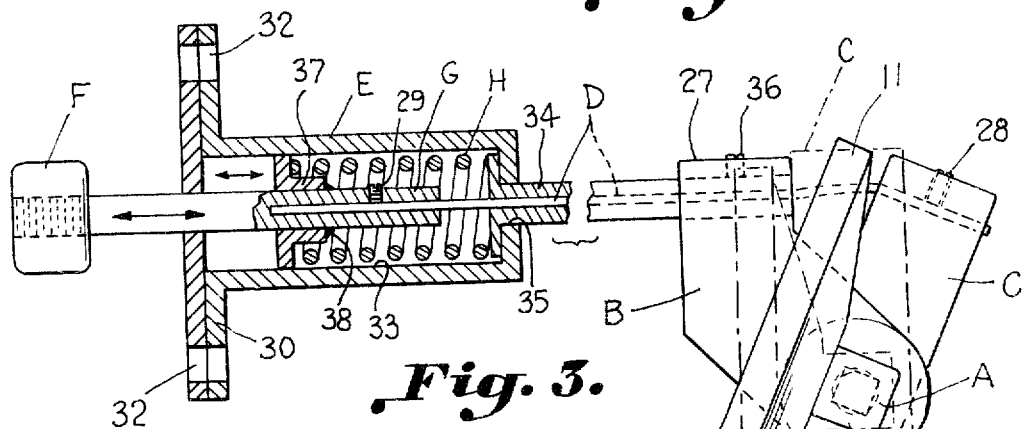
FIG. 3 is a schematic plan view further illustrating the assembly shown in FIG. 1.
Figure 2:
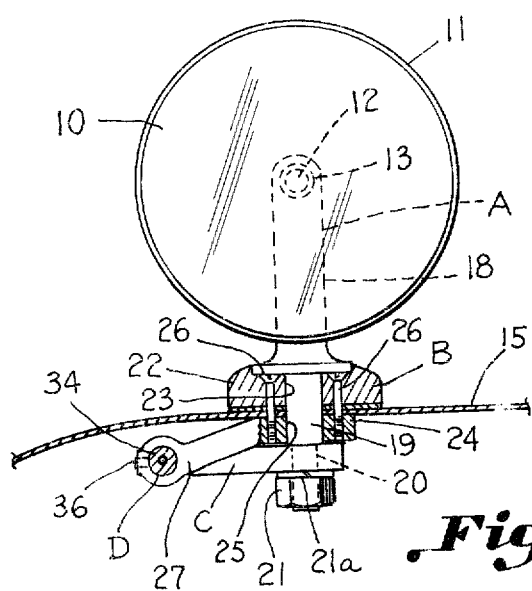
FIG. 2 is a transverse sectional elevation taken on the line 2—2 in FIG. 1 illustrating the mirror and associated mounting and operating linkage mechanism.

The linkage means C is illustrated in FIG. 3 in a first dotted line position which is the adjusted position adjacent the arm 27 which serves as a stop therefor. When the pedal F is in fully depressed position, the linkage means C assumes the solid line also in FIG. 3 and the mirror is in the extreme position of its scanning range to check passing vehicles. The mirror is then in solid line position in FIG. 3. As will be observed, the resilient means H automatically returns the mirror to adjusted or broken line position in FIG. 3.

The flexible cable B is connected on one end to the linkage means C as by the set screw 28 and on the other end to the operator G which has connection to the foot pedal F as by the set screw 29. The elongated housing E has a flange 30 at right angles thereto and is secured by means of screws 31 which pass through apertures 32 in the flange 30 fixing the housing E to the floorboard 17. The housing E has an internal bore 33 for receiving a coil compression spring H. A sheath 34 of the flexible cable D is received on one end as at 35 within the housing E and on the other end within the arm 27 and fixed therein as by the set screw 36. A retaining ring 37 is carried by the operator G for confining the bearing against the compression spring H. The operator which carries the retaining ring 37 fixed thereto as by welding 38 moves in a reciprocal movement as illustrated by the arrows in FIG. 3 responsive to the pedal F. The pedal F is capable of moving from the extreme outward position illustrated in FIG. 3 entirely against the floorboard resulting in an extreme movement of the mirror as illustrated in solid lines in FIG. 3. The pedal F will return to retracted position illustrated in FIG. 3, responsive to the spring H, returning the mirror and its associated linkage to broken line position in FIG. 3.

It will be thus observed that the driver, without removing his hands from the steering wheel 16, may depress the pedal F resulting in compression of the spring H and sliding movement of the cable D connected to the linkage mechanism resulting in movement of the mirror 10 and its associated frame 11 through a suitable arc to check for the presence and position of passing vehicles.

While a preferred embodiment of the invention has been described using specific terms, description is for illustrative purposes only, and it is to be understood that changes and variations may be made without departing from the spirit or scope of the following claims.

What is claimed is:

1. A rear view mirror mounted externally of a vehicle operable by the driver's foot adjacent the floorboard interiorly of the vehicle for observing the position of a passing motorist comprising:

a substantially vertical standard carried externally of the vehicle supporting the mirror in an adjusted position;

means for mounting said standard on said vehicle for oscillatory movement about a fixed substantially vertical axis externally of the vehicle;

linkage means carried by said standard extending laterally thereof;

a flexible cable connected on one end to said linkage means for moving said linkage means imparting oscillatory movement to said standard;

an elongated housing carried by said vehicle adjacent the floorboard for receiving the other end of said cable;

a pedal carried interiorly of said vehicle adjacent the floorboard depressible by the driver's foot;

an operator extending from said pedal into said housing engaging said other end of said cable within said housing for movement responsive to movement of the pedal; and resilient means within said housing, exerting a resilient force urging said operator in a direction against movement by the pedal;

whereby the mirror may be moved from said adjusted position to a position for observing a passing motorist by depression of the pedal by the driver's foot, and whereby the mirror will return to said adjusted position automatically responsive to said resilient means upon release of the pedal by the driver's foot.

2. The structure set forth in claim 1 wherein said resilient means is a coil spring carried on said operator bearing against a retaining ring fixed on said operator on one end and being confined within said housing on the other.

* * * * *